S. W. May
Corn Harvester.

Nº 22440 — Patented Dec. 28, 1858.

Witnesses.

Inventor.
S. W. May,

UNITED STATES PATENT OFFICE.

S. W. MAY, OF GALESBURG, ILLINOIS.

IMPROVEMENT IN MACHINES FOR PICKING CORN.

Specification forming part of Letters Patent No. 22,440, dated December 28, 1858.

*To all whom it may concern:*

Be it known that I, S. W. MAY, of Galesburg, in the county of Knox and State of Illinois, have invented a new and useful Improvement in Machines for Picking Corn; and I do hereby declare that the following is a full and exact description of the construction and operation of the same, reference being had to the annexed drawings, making a part of this specification, in which—

Figure 1:
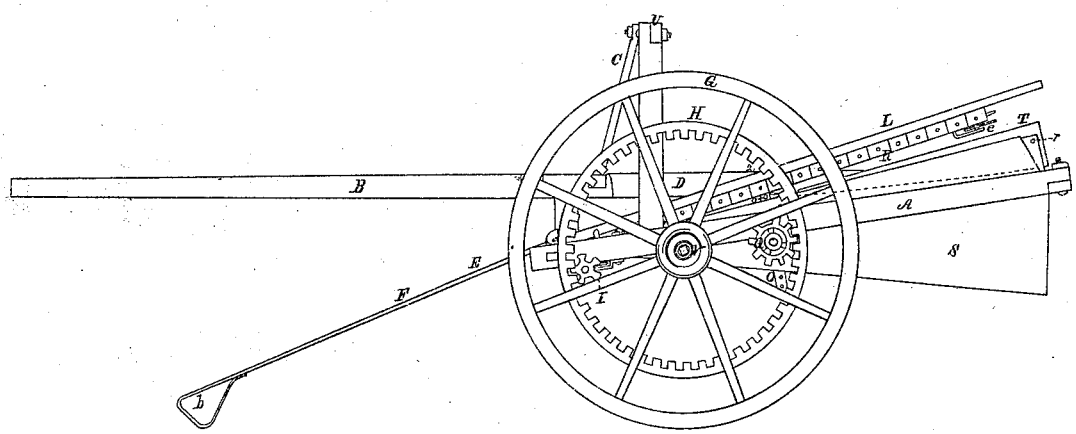
Figure 2:
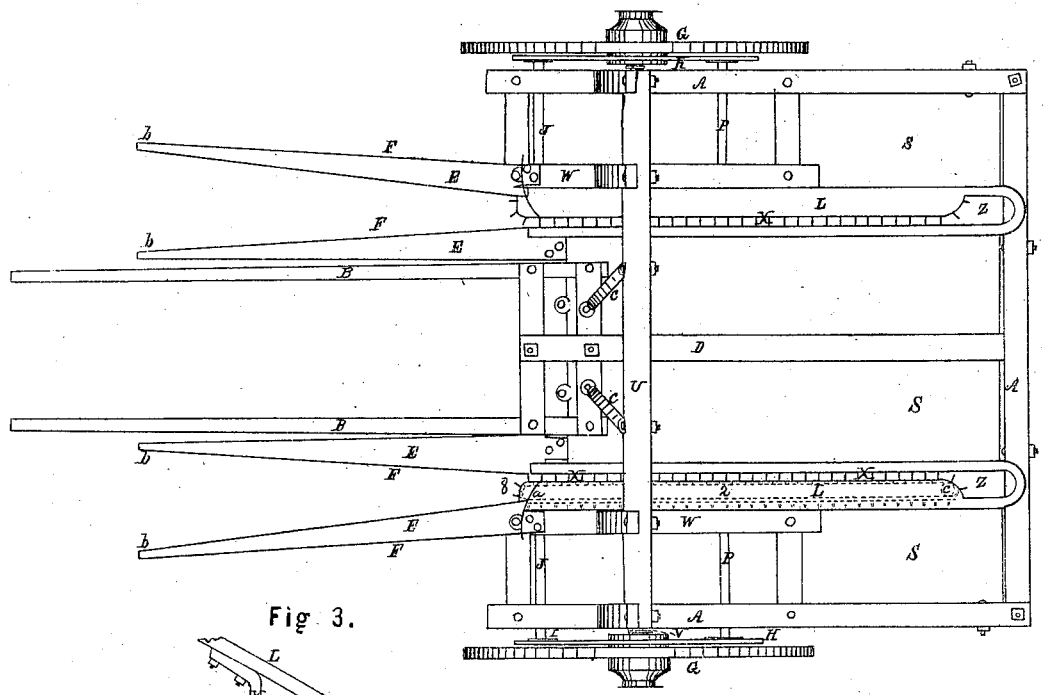
Figure 3:
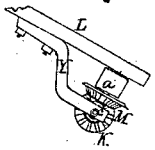

Figure 1 is a side elevation. Fig. 2 is a vertical or bird's-eye view. Fig. 3 is an enlarged sectional view of picking-bar L, miter-wheels K and M, pulley a, and arm Y.

Similar letters of reference indicate corresponding parts in each of the several figures.

To enable others skilled in the art to make and use my invention, I will proceed to describe its construction and operation.

In Figs. 1 and 2, A A A is the main frame, mounted on wheels G G, and so constructed as not to break down cornstalks, and substantially as represented in the accompanying drawings.

B B are thills fastened firmly to the upper cross-beam, U, of frame A by braces C C, and also to A by beam D, and in a central position, as seen in Fig. 2, so that the horse may walk between the two rows picked.

E E are elevators to straighten up leaning or fallen stalks. The ends *b b* of E E are bent similar to sled-runners, that they may pass over hillocks, and then they will spring upward at points F F. E E are firmly fastened to A A by bolts.

L L are strong bars, each having a channel, X, opening to receive the stalks at the front end of the bar, and extending back nearly the whole length of it. This channel enlarges into a large opening, Z, at the upper rear end of bar L; but except this opening X is about one and three-eighths of an inch in width. In Fig. 1 the upper end of picking-bar L is sustained by pitman O *o*, which pitman is attached to the under side of bar L by a mortise-joint beneath point 2, Fig. 2. O *o* has several holes to receive a crank turned on the inner end of shaft P, by which to raise or depress bar L, so as to suit the height of the corn. Shaft P is revolved by wheel Q, and Q by H.

On wheels G G are cog-circles H H, gearing into pinions I I. Pinion I is fastened on the outer end of shaft J. (See Fig. 2.) The inner end of J is seen at *e*, Fig. 3, as passing through miter-wheel K into arm Y, which arm sustains the lower end of the main part of bar L. K gears into wheel M, and pulley *a* is fastened to M, and bar L vibrates upon pivot *e*. The other side of bar L has its pivot directly opposite to the inner end of shaft J, Fig. 2.

Beneath and fastened to the under side of bar L is a flange or lip, turned so as to retain the fingers of R against the under surface of L.

Pulleys *a* and *c* (see Fig. 2, dotted outline) have wide flanges *i*, Fig. 1, so as better to retain belt R, which passes around them. This belt consists of india-rubber belting, with blocks fastened thereon, and these blocks have iron fingers projecting out from them. The pulleys and fingered belt are situated beneath bar L, and are shown in dotted outline on the left-hand bar. (See Fig. 2.) An endless chain with fingers may be preferable to this belt. S S S are boxes for receiving the picked corn, having their bottoms inclined downward toward the rear of the machine. The edges T of these boxes, swinging on pivots *n*, may be raised or depressed, when the bars L are raised or depressed, by inserting pin *r* into different holes in T. These boxes may have end-gates in their lower rear ends, by raising which the picked corn may be shoved out periodically; or the gates may be left out entirely, and beneath the back edges of the boxes may be passed an endless apron running over a pulley, the pulley elevated similar to those in use on harvesters, thus to elevate the picked corn into a wagon driven by the side of the picker. The axle-trees V extend and join on to the part W W of frame A A. The driver's seat is placed on the frame in a position such as by his weight to cause the machine to balance upon the axle-trees.

Operation: The bar L, by means of the holes in pitman O, must be raised or depressed so that the upper rear end shall be above the average height that the corn grows on the stalks. The lower end of L is always below this height. The machine being drawn along, the wheel G gives rotary motion through gearing H and I to shaft J, and J, through miter-wheels K and M, gives rotary motion to pulley *a* and to endless belt R. This motion of R is such that when the fingers on R cross channel X then they are passing backward a trifle faster than the machine passes forward over the ground. Wheel G, through the gearing H and Q, gives motion to shaft P, and the crank on the inner end of P, operating pitman O, gives to L an upward and downward motion. On entering the field the elevators E E, passing on either side of the row of corn, straighten up and conduct the stalks to the point 8, Fig. 2. From point 8 the fingers on belt R, passing rapidly, as described, take each its quota of stalks into and along the channel X, and X is of such width as to prevent all good ears from passing downward through it. Therefore by the upward motion of L the ears of corn are stripped upward and off from the stalks. This picked corn falls into the hoppers or boxes S S S.

The principal advantages of this machine are that its action is confined to a short distance on the length of the stock, and consequently a far less amount of leaves will be gathered than in other machines; that by means of the opening Z and the confined action above named no tops of stalks can be gathered; that its action is gentle and not liable to clip or cleave off either stalks, tops, or leaves; that the draft of it will be light, and that one hand can run it.

I claim—

The bars L, the elevators E, the fingered belt R, the frame A, the crank, with its pitman O, or their mechanical equivalents, the whole being combined, arranged, and operated substantially as and for the purpose set forth.

S. W. MAY.

Witnesses:
H. H. MAY,
J. P. STODDARD.